(12) United States Patent
Rai et al.

(10) Patent No.: US 6,369,866 B1
(45) Date of Patent: Apr. 9, 2002

(54) LIQUID CRYSTAL DISPLAY HAVING A LIGHT COLLECTING MECHANISM WITH A LIGHT TRANSMITTER OPTICALLY CONNECTED TO THE LIGHT GUIDE PLATE AND LIGHT COLLECTOR FOR COLLECTING AMBIENT LIGHT

(75) Inventors: Yasuki Rai; Hisao Uehara, both of Ogaki; Yasushi Marushita, Gifu; Makoto Shimizu, Ogaki, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/251,978

(22) Filed: Feb. 18, 1999

(30) Foreign Application Priority Data

Feb. 19, 1998 (JP) .......................................... 10-037343
Jan. 12, 1999 (JP) .......................................... 11-005384

(51) Int. Cl.⁷ ........................ G02F 1/1335; G02F 1/1333
(52) U.S. Cl. ........................... 349/61; 349/62; 349/63; 349/65; 349/57; 349/58
(58) Field of Search ............................ 349/61, 62, 63, 349/65, 57, 58

(56) References Cited

U.S. PATENT DOCUMENTS 5,101,325 A * 3/1992 Davenport et al. .......... 362/31
5,121,232 A * 6/1992 Miyadera ...................... 359/49
6,011,602 A * 1/2000 Miyashita et al. ............. 349/65
6,025,897 A * 2/2000 Weber et al. ................. 349/96
6,034,750 A * 3/2000 Rai .............................. 349/57
6,104,454 A * 8/2000 Hiyama et al. ................ 349/65
6,147,725 A * 11/2000 Yuuki et al. .................. 349/65

* cited by examiner

Primary Examiner—William L. Sikes
Assistant Examiner—Mike Qi
(74) Attorney, Agent, or Firm—Sheridan Ross P.C.

(57) ABSTRACT

An improved liquid crystal display device of the type having a liquid crystal display panel, a light guide plate below a surface of the display panel and located between a reflecting portion and a diffusing portion, and a light collecting lens located at one end of the light guide plate for collecting and transmitting light to the light guide plate for providing backlight to the display panel. The display device includes a light transmitter located between the light collecting lens and the light guide plate. The light transmitter optically connects the light collecting lens and the light guide plate and separates the light collecting lens from the display panel by a predetermined difference. The light transmitter allows light to be more evenly distributed or reflected onto the display panel so that images displayed on the panel have a more uniform brightness.

15 Claims, 3 Drawing Sheets

LIQUID CRYSTAL DISPLAY HAVING A LIGHT COLLECTING MECHANISM WITH A LIGHT TRANSMITTER OPTICALLY CONNECTED TO THE LIGHT GUIDE PLATE AND LIGHT COLLECTOR FOR COLLECTING AMBIENT LIGHT

The present invention relates to liquid crystal displays, and more particularly, to liquid crystal displays having mechanisms that collect ambient light to illuminate the display.

A liquid crystal display (LCD) includes pairs of opposing transparent electrodes, and liquid crystal, which is contained between the electrodes. The liquid crystal is electro-optically anisotropic. The application of a predetermined voltage between the electrodes forms an electric field with the liquid crystal. This causes the liquid crystal to exhibit optical properties that correspond to the field density. The LCD has a plurality of pixels. An image is formed by applying a different voltage to each pixel so that the pixel obtains the desirable brightness. A typical LCD employs a backlight to illuminate the display from behind.

In addition to a compact and thin profile, an LCD has low power consumption. Thus, LCDs are often used in office automation equipment and audio visual equipment. Portable equipment having LCDs are often used outdoors, where ambient light is abundant. In such cases, the ambient light may be used in lieu of the backlight to further decrease power consumption by a significant amount.

A prior art LCD will now be described with reference to FIG. 1, which is a cross-sectional view showing an LCD 100.

The LCD 100 has a display panel 10, a backlight 80 arranged behind the display panel 10, and a case 70 housing the display panel 10 and the backlight 80. The backlight 80 includes a light guide plate 20, a light source 50 arranged on one end of the light guide plate 20, a collecting lens 60 arranged on the other end of the light guide plate 20, a diffusing portion 30 arranged on a front side of the light guide plate 20, and a reflecting portion 40 arranged below or on the rear side of the light guide plate 20.

The light source 50, which may be a fluorescent lamp, is encompassed by a reflector 51. The light guide plate 20 may be made of acrylic resin. A convex lens, which is formed separately from the light guide plate 20 or integrally with the light guide plate 20, may be employed as the collecting lens 60. The case 70 has an opening 71, which is located at a position corresponding to the collecting lens 60 which allows the collecting lens 60 to project outward through the opening 71 to allow the collecting lens 60 to collect light from outside of the case 70.

Light, which is emitted by the light source 50 or collected by the collecting lens 60, is transmitted to the light guide plate 20. The light is then refracted by the light guide plate 20 toward the diffusing plate 30 or the reflecting portion 40. The reflecting portion 40 may be a plate, a film or a coating including a reflecting surface. The diffusing portion 30 may also be a plate, a film or a coating including a diffusing surface. The reflecting portion 40 reflects the light toward the diffusing portion 30 through the light guide plate 20. The diffusing portion 40 diffuses the light so that some of the light forms an even light plane that is irradiated toward the display panel 10, while the remaining light is returned toward the light guide plate 20 to be reflected again by the reflecting portion 40. Accordingly, the intensity of the light attenuates as it bounces back and forth horizontally between the diffusing portion 30 and the reflecting portion 40.

The display panel 10 does not emit light by itself. Thus, the display panel 10 is illuminated from behind. The light permeability of the display panel 10 is controlled in order to distribute the light passing through the display panel 10 in a desired pattern so that images can be visualized on the display panel 10.

The light source 50 is lit to illuminate a bright image on the display panel 10 when ambient light is insufficient, such as during indoor usage. The light source 50 is turned off when ambient light is abundant, such as during outdoor usage on a sunny day. Under such conditions, the light collected by the collecting lens 60 is used to illuminate the display panel 10. Thus, although power for driving the display panel 10 is still necessary, power for driving the light source 50 becomes unnecessary. This reduces the total power consumption of the LCD 100.

The relationship between brightness relative to positions on the display panel 10 during sole usage of the collecting lens 60, is shown in the graph of FIG. 2. The horizontal axis represents the lateral position on the display panel 10, while the vertical axis represents the brightness. Position A indicates the illuminated right end on the display panel 10 that is closest to the collecting lens 60 and position B indicates the illuminated left end of the display panel 10. The light collected by the collecting lens 60 travels from position A to position B, as viewed in the graph of FIG. 2. As shown in the graph, there are several brightness peaks. The value of the peak closest to position A is maximum, and the values of the other peaks decrease as the distance from position A increases.

The distance between adjacent peaks is determined by the size of the illuminated portion on the display panel 10. For example, in a two inch LCD, the width of which is 45 millimeters, the distance between adjacent peaks is approximately 15 millimeters. In a fifteen inch LCD, the width of which is 190 millimeters, the distance between adjacent peaks is approximately 60 millimeters. Such peaks, or brightness fluctuation, results in the illumination of visual brightness stripes and lowers the quality of the En image illuminated on the display panel 10.

Accordingly, it is an objective of the present invention to provide an LCD having uniform brightness.

SUMMARY OF THE INVENTION

To achieve the above objective, the present invention it provides a liquid crystal display comprising a liquid crystal display panel, a light guide plate arranged adjacent to the display panel, a light transmitter optically connected to the light guide plate, and a light collector optically connected to the light transmitter.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
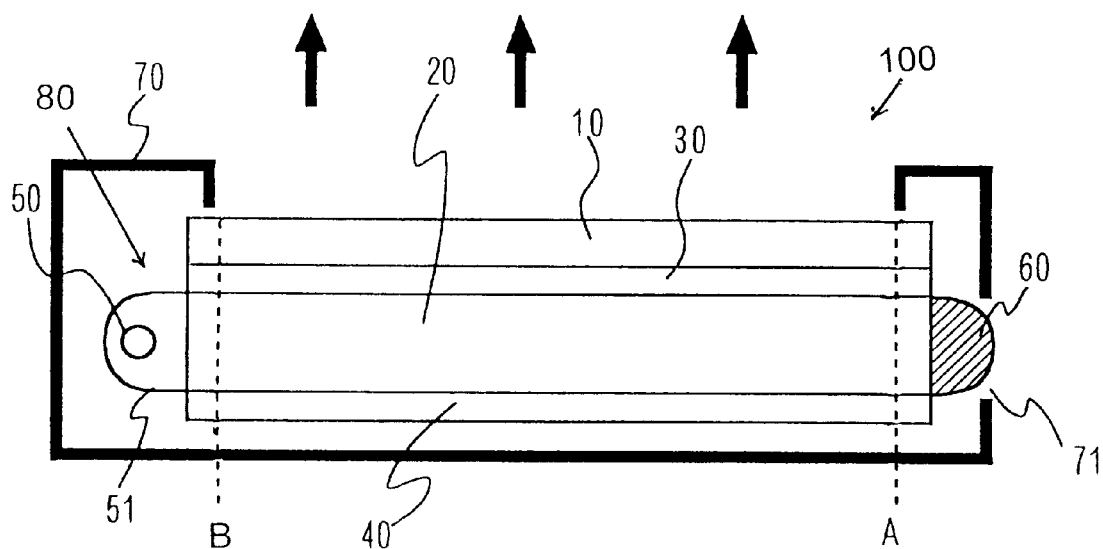
FIG. 1 is a cross-sectional view showing a prior art liquid crystal display.

In the drawings, like numerals are used for like elements throughout.

Figure 3:
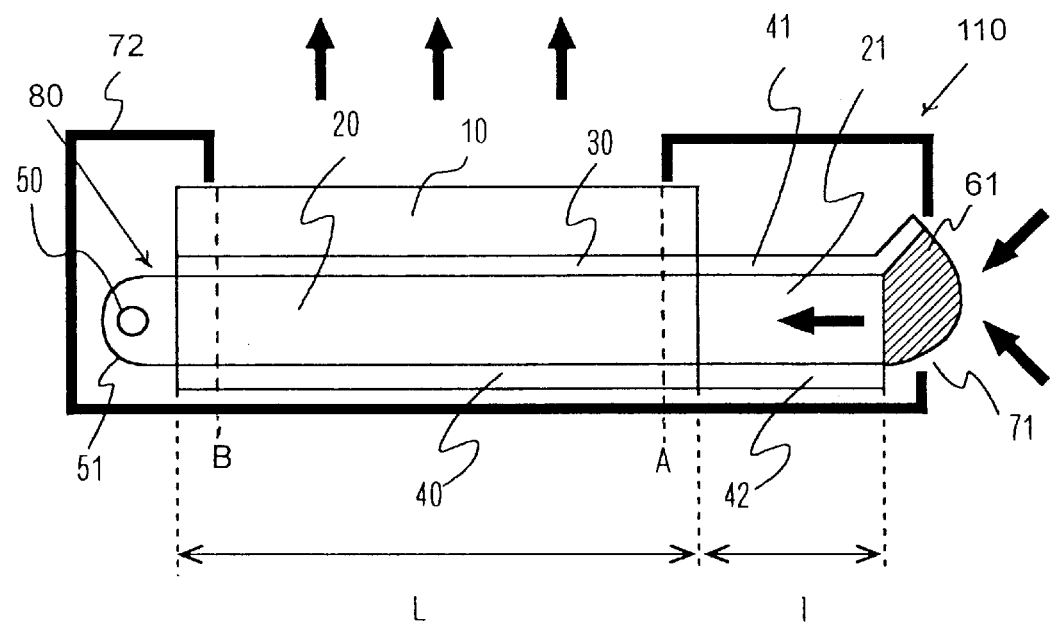
FIG. 3 is a cross-sectional view showing a liquid crystal display according to a first embodiment of the present invention.

A liquid crystal display (LCD) 110 according to a first embodiment of the present invention will now be described with reference to FIGS. 3 and 4. The following description will mainly center on parts of the LCD 110 differing from the description of the prior art LCD 100. The LCD 110 includes a collecting lens 61 and a display panel 10 that are separated from each other by a predetermined distance "l". As shown in FIG. 3, the LCD 110 has a liquid crystal display panel 10, a backlight 80, and a case 72, which houses the display panel 10 and the backlight 80. The backlight 80 includes a light guide plate 20, a light source 50, the collecting lens 61, a diffusing portion 30, and a reflecting portion 40. The display panel 10, the backlight 80, the light guide plate 20, the light source 50, the diffusing portion 30, and the reflecting portion 40 are all conventional components, which were described in the description of the prior art. The case 72 and the collecting lens 61, although similar to the prior art case 70 and lens 60, have been modified as described below. A light transmitter 21 is arranged between the collecting lens 61 and the display panel 10. The light transmitter 21 has reflecting portions 41 and 42 on its top and bottom surfaces, respectively.

The display panel 10 faces upwards, as viewed in FIG. 3, and includes pairs of transparent electrodes (not shown), and liquid crystal, which is contained between the electrodes. However, the display method of the display panel 10 is not limited and may employ other methods. For example, thin-film transistors using a polycrystal semiconductor such as polysilicon may be employed by the display panel 10. In this case, it is desirable that a driver, which includes display pixels formed integrally on the same substrate and a peripheral driver integrated circuit (IC), be incorporated in the display panel 10. This eliminates the necessity for attaching the driver IC to the exterior of the display panel 10 and decreases the size of the frame of the display panel 10. As a result, a more compact and light LCD 110, which is optimal for portable equipment, can be manufactured.

The diffusing portion 30 is located below the display panel 10, and the light guide plate 20 is located below the diffusing portion 30, as viewed in FIG. 3. The light guide plate 20 is preferably made of a material having high transparency, such as acrylic resin, polycarbonate, or glass. It is preferable that the length of the light guide plate 20 be substantially the same as the length of the display panel 10, and that the light guide plate 20 extend no more than five millimeters from the display panel 10. The reflecting portion 40 is located at the lower side of the light guide plate 20, as viewed in FIG. 3. Small recesses (not shown) are formed in the surface of the reflecting portion 40 so that light is reflected evenly by the reflecting portion surface. The reflectance and reflecting angle of the reflecting portion surface depends on the size and quantity of the recesses and differs between locations. More specifically, the recesses are formed such that the reflectance of the reflecting portion 40 is increased at positions where the brightness is low, and such that the reflectance is decreased at positions where the brightness is high. Furthermore, the reflecting angle is adjusted such that light is reflected toward positions on the display panel 10 where the brightness is low.

The light transmitter 21 separates the light collecting lens 61 from the display panel 10 by a predetermined distance and optically connects the light collecting lens 61 with the light guide plate 20. The light transmitter 21 can be formed integrally with or separately from the light guide plate 20.

The case 72 has an opening 71, through which the light collecting lens 61 projects. The light collecting lens 61 is formed integrally with or separately from the right end of the light transmitter 21. Furthermore, the light collecting lens 61, which preferably extends generally perpendicular to the plane of FIG. 3, has a convex shape to allow ambient light to converge toward the light transmitter 21. The light collecting lens 61 has a generally arcurate surface to form a convex shape. The light collecting lens 61 preferably has a diameter, or height that is greater than the thickness of the light guide plate 20 to increase the amount of light it collects. Furthermore, the light collecting lens 61 has an inclined surface that extends diagonally upward from the light transmitter 21, as viewed in FIG. 3.

The reflecting portions 41, 42 extend longitudinally from one end of the light transmitter 21, which is connected with the light guide plate 20, to the other end of the light transmitter 21, which is connected with the light collecting; lens 61. Thus, except for the end faces that are connected with the light guide plate 40 and the light collecting lens 61, the light transmitter 21 is preferably completely encompassed by the reflecting portions 41, 42. The reflecting portions 41, 42 preferably have even surfaces and do not have small recesses like the reflecting portion 40. The reflecting portion 41 further extends along and encompasses the display panel side, or the inclined surface, of the light collecting lens 61. A light source 50 is arranged at the left side of the light guide plate 40. The light source 50 is lit when ambient light is insufficient, such as during nighttime or indoor usage. The light source 50 is encompassed by a reflector 51 to efficiently direct light toward the light guide plate 20. The case 71, although similar to the prior art case 70, has been modified to enclose the light transmitter 21, more specifically, the case 71 is longer than the case 70.

The ambient light collected by the light collecting lens 61 is transmitted toward the light guide plate 20 by the light transmitter 21. The incident light is reflected toward the diffusing portion 30 by the reflecting portion 40 to illuminate the display panel 10 from behind. The reflecting portions 41, 42 guide the light in the light transmitter 21 toward the light guide plate 20 without substantially diffusing and attenuating the light. The if light guide plate 20 then reflects the light upward, as viewed in FIG. 3, with the reflecting portion 40 and diffuses the light with the diffusing portion 30. Some of the light is used to illuminate the display panel 10, while the remaining light is reflected back toward the reflecting portion 40. As the light bounces back and force, the light proceeds toward the left end of the display panel 10. This illuminates a substantially even plane of light on the entire surface of the display panel 10. As a result, an image is illuminated with uniform brightness on the display panel 10. In FIG. 3, the bold arrows represent the direction in which light travels.

Figure 2:
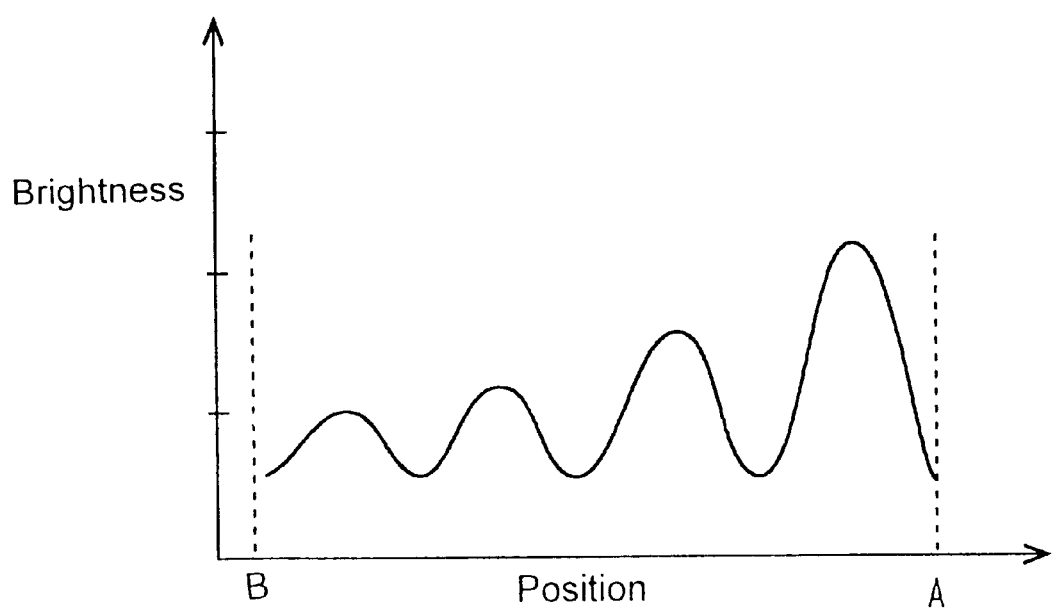
FIG. 2 is graph showing the relationship between brightness relative to positions on the display panel of FIG. 1.
Figure 4:
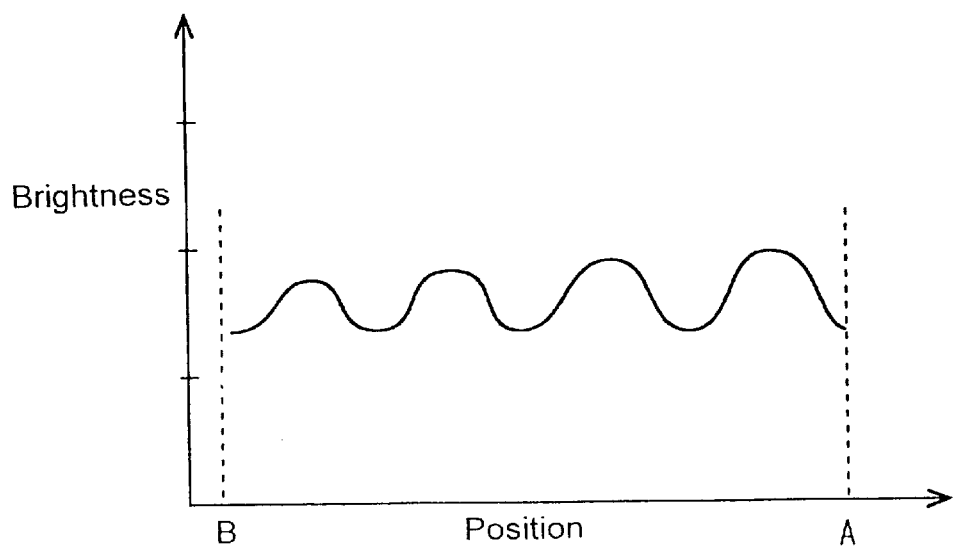
FIG. 4 is a graph showing the relationship between brightness relative to positions on the display panel of FIG. 3.

As shown in the graph of FIG. 4, the brightness of the image illuminated on the display panel 10 is more uniform than the images illuminated by the prior art LCD 100. Position A indicates the right end of an image illuminated on the display panel 10 that is closest to the collecting lens 61 and position B indicates the left end of an image illuminated on the display panel 10. The light collected by the collecting lens 61 travels toward the left from position A, as viewed in the graph of FIG. 4. As shown in the graph, there are several brightness peaks. However, in comparison to the peaks of the prior art LCD 100 shown in FIG. 2, the peaks are included within a more narrow range and the average brightness is amplified. This is because the light collected by the light collecting lens 61 is made to be uniform when passing through the light transmitter 21. More specifically, ambient light is collected from all directions by the light collecting lens 61 and directed toward the light guide plate 20, while being reflected back and forth by the reflecting portions 41, 42. The light is made substantially uniform in the light transmitter 20 by the repetitive reflection between the reflecting portions 41, 42. Therefore, the brightness at position A, which is closest to the light collecting lens 61, is prevented from becoming significantly high in comparison to other positions. This increases the overall brightness of the illuminated image.

The uniform brightness characteristic, which is apparent from the graph of FIG. 4, differs in accordance with the length of the light transmitter 21. Experiments have been conducted to confirm the optimal length of the light transmitter 21 that obtains the desirable brightness characteristic. The experiments have been conducted to confirm the optimal length of the light transmitter 21 in relation to the LCD dimensions. For example, a two inch LCD (the display of which has a length L of about 45 millimeters and a height of about 50 millimeters) requires the light transmitter 21 to have a length l of at least approximately five millimeters to obtain the desirable brightness characteristic. The length l of the light transmitter 21 is preferably 10 to 20 millimeters and optimally 15 millimeters. Further, the length l of the light transmitter 21 depends more on the length of the display than on the width (width the direction extending perpendicular to the plane of FIG. 3) of the display. Some of the light passing through the light transmitter 21 is absorbed by the light transmitter 21. Thus, it is preferable that the light transmitter 21 be shorter than 25 millimeters to prevent a decrease in the brightness of the image illuminated on the display. The ratio between the length l of the light transmitter 21 and the length L of the display panel 10 (l:L) is preferably 1:10 to 5:9, more preferably 2:4 to 4:9, and optimally 1:3. However, in a large LCD, the optimal ratio of 1:3 may result in an excessively long light transmitter 21. In such cases, the length of the light transmitter 21 may be impacted by other design considerations, within a range that obtains the desirable brightness characteristic.

Figure 5:
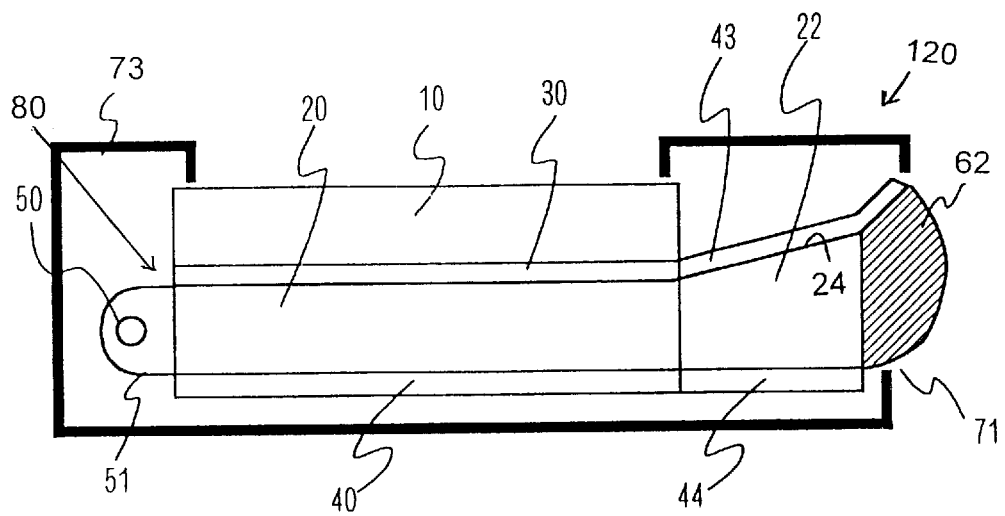
FIG. 5 is a cross-sectional view showing a liquid crystal display, according to a second embodiment of the present invention.

A second embodiment of the present invention will now be described with reference to FIG. 5. In the second embodiment, an LCD 120 employs a light transmitter 22, which shape differs from that employed in the first embodiment, and a larger light collecting lens 62.

The light transmitter 22 has an oblique front surface 24, which is inclined toward the liquid crystal display panel 10. In addition, the light transmitter 22 does not have a uniform thickness, and is more thick at positions closer to the light collecting lens 62. The enlarged light collecting lens 62 collects a larger amount of light than that employed in the first embodiment. Except for the end faces that are connected with the light guide plate 20 and the light collecting lens 62, the light transmitter 22 is completely encompassed by reflecting portions 43, 44.

Light is collected by the light collecting lens 62 and transmitted to the light transmitter 22 and reflected back and forth between the reflecting portions 43, 44 as the light advances toward the light guide plate 20. The inclination angle of the front surface 24 of the light transmitter 22 may be changed for different devices, in which the LCD 120 is to be incorporated.

Figure 6:
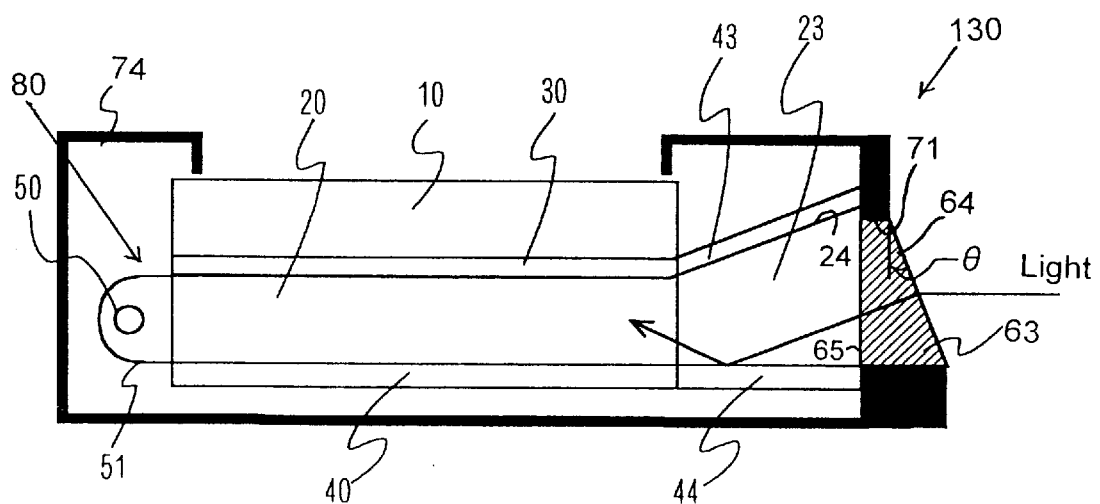
FIG. 6 is a cross-sectional view showing a liquid crystal display according to a third embodiment of the present invention.

The light collecting lens 62 may be replaced by a light collector 63 having a substantially flat outer surface 64, such as that shown in FIG. 6. FIG. 6 is a cross-sectional view of a third embodiment of an LCD 130 in accordance with the present invention. In the LCD 130, the light collector 63 is arranged in the opening 71 of the case 74 and is generally in the shape of a right triangle and the hypotenuse is exposed to ambient light. The light collector 63 has a flat inner surface 65, which is connected with the light transmitter 23, and an inclined outer surface 64, which is inclined relative to the inner surface 65 by a predetermined angle θ. The light collector 63 does not necessarily have to be formed separately from the light transmitter 23. In other words, the light collector 63 may be formed integrally with the light transmitter 23. In such case, the surface 65 is a hypothetical plane extending perpendicular to the light guide plate 20. Horizontal, incident light is refracted by the outer surface 64 of the light collector 63. Thus, horizontal light is also reflected between the reflecting portions 43, 44. The inclination angle θ guarantees refraction of ambient light toward the light collector 63. Thus, light is transmitted toward the light transmitter 23. This generates an image that is illuminated with uniform brightness. The preferable inclination angle θ of the outer surface 64 is about 43 degrees. However, the inclination angle θ may be more or less than 43 degrees.

The thickness of the light transmitter 23 may be decreased to obtain the desirable uniform bright properties when the light transmitter 23 is short. However, as shown in FIG. 6, it is desirable that the light transmitter 23 have a length that permits the light entering through a middle portion of the light collector 63 to be reflected by the reflecting portion 44 at least once. Furthermore, it is preferable that the opening 71 be completely filled by the light collector 63 without any gaps. This prevents the leakage of light and decreases the dimensions of the case 74.

It should be apparent to those skilled in the art that the present invention may be embodied in many other specific: forms without departing from the spirit or scope of the invention. Therefore, the present examples and embodiments are to be considered as illustrative and not restrictive, and the invention is not to be limited to the details given herein, but may be modified within the scope and equivalence of the appended claims.

What is claimed is:

1. A liquid crystal display comprising:
   a liquid crystal display panel;
   a light guide plate arranged adjacent to the display panel;
   a light transmitter located between the light collector and the light guide plate, that optically connects the light collector and the light guide plate, for separating the light collector from the display panel by a predetermined distance; and
   a light collector optically connected to the light transmitter for collecting ambient light, wherein the light collector includes a convex lens.

2. A liquid crystal display comprising:
   a liquid crystal display panel;
   a light guide plate arranged adjacent to the display panel;
   a light transmitter located between the light collector and the light guide plate, that optically connects the light collector and the light guide plate, for separating the light collector from the display panel by a predetermined distance; and a light collector optically connected to the light transmitter for collecting ambient light, wherein the light transmitter is formed integrally with the light guide plate, and wherein the light collector is substantially flat.

3. The liquid crystal display according to claim 2, wherein the light collector includes a flat surface connected with the light transmitter, and an inclined surface opposed to the flat surface and inclined relative to the flat surface by a predetermined angle.

4. The liquid crystal display according to claim 3, wherein the predetermined angle is such that the light transmitter reflects the light entering through a middle portion of the light collector at least once.

5. The liquid crystal display according to claim 3, wherein the predetermined angle is such that the light transmitter reflects light travelling parallel to the light guide plate and entering through a middle portion of the light collector at least once.

6. A liquid crystal display comprising:
   a liquid crystal display panel;
   a light guide plate arranged adjacent to the display panel;
   a light transmitter optically connected to the guide plate; and
   a light collector optically connected to the light transmitter, wherein the ratio between a length of the light transmitter and a length of the display panel is within a range of about 1:10 to 5:10.

7. The liquid crystal display according to claim 6, wherein the ratio between the length of the light transmitter and the length of the display panel is about 2:4 to 4:9.

8. A liquid crystal device having a liquid crystal display panel and a light guide plate located adjacent to a surface of the display panel and disposed between a reflecting portion and a diffusing portion, the liquid crystal display device comprising:
   a light collector located at one end of the light guide plate for collecting and transmitting light to the light guide plate for providing backlight to the display panel; and
   a light transmitter located between the light collector and the light guide plate, that optically connects the light collector and the light guide plate, for separating the light collector from the display panel by a predetermined distance, wherein a ratio between a length of the light transmitter and a length of the display panel is within a range of about 1:10 and 5:9.

9. A liquid crystal display device having a liquid crystal display panel and a light guide plate located adjacent to a surface of the display panel and disposed between a reflecting portion and a diffusing portion, the liquid crystal display device comprising:
   a light collector located at one end of the light guide plate for collecting and transmitting ambient light to the light guide plate for providing backlight to the display panel; and
   a light transmitter located between the light collector and the light guide plate, that, optically connects the light collector and the light guide plate, for separating the light collector from the display panel by a predetermined distance, wherein the light collector has a first substantially flat surface that connects to the light transmitter, a generally arcuate surface that extends from one end of the flat surface, and a second substantially flat surface that extends between the other end of the first flat surface and the arcuate surface, and wherein the second flat surface is covered by the diffusing portion.

10. A liquid crystal display device having a liquid crystal display panel and a light guide plate located adjacent to a surface of the display panel and disposed between a reflecting portion and a diffusing portion, the liquid crystal display device comprising:
    a light collector located at one end of the light guide plate for collecting and transmitting ambient light to the light guide plate for providing backlight to the display panel; and
    a light transmitter located between the light collector and the light guide plate, that optically connects the light collector and the light guide plate, for separating the light collector from the display panel by a predetermined distance, wherein a thickness of the light transmitter is less than a diameter of the light collector.

11. A liquid crystal display device having a liquid crystal display panel and a light guide plate located adjacent to a surface of the display panel and disposed between a reflecting portion and a diffusing portion, the liquid crystal display device comprising:
    a light collector located at one end of the light guide plate for collecting and transmitting ambient light to the light guide plate for providing backlight to the display pane; and
    a light transmitter located between the light collector and the light guide plate, that optically connects the light collector and the light guide plate, for separating the light collector from the display panel by a predetermined distance, wherein the thickness of the light transmitter increases as it approaches the light collector.

12. The display device of claim 11, wherein the light collector is generally in the shape of a right triangle and the hypotenuse is exposed to ambient light and one other side is coupled to the light transmitter.

13. An improved liquid crystal display device of the type having a liquid crystal display panel, a light guide plate below a surface of the display panel and disposed between a reflecting portion and a diffusing portion, and a light collector located at one end of the light guide plate for collecting and transmitting ambient light to the light guide plate for providing backlight to the display panel, the improvement comprising:
    a light transmitter located between the light collector and the light guide plate, that optically connects the light collector and the light guide plate, for separating the light collector from the display panel by a predetermined distance, wherein a thickness of the light transmitter is less than a diameter of the light collector.

14. An improved liquid crystal display device of the type having a liquid crystal display panel, a light guide plate below a surface of the display panel and disposed between a reflecting portion, and a diffusing portion, and a light collector located at one end of the light guide plate for collecting and transmitting ambient light to the light guide plate for providing backlight to the display panel, the improvement comprising:
    a light transmitter located between the light collector and the light guide plate, that optically connects the light collector and the light guide plate, for separating the light collector from the display panel by a predetermined distance, wherein a ratio between a length of the light transmitter and a length of the display panel is within a range of about 1:10 to 5:9.

15. The display device of claim 14, wherein the ratio is within the range of about 2:4 and 4:9.

* * * * *